United States Patent
Lee et al.

(10) Patent No.: US 10,248,242 B2
(45) Date of Patent: Apr. 2, 2019

(54) FORCE-TOUCH SENSING APPARATUS WITH METAL TRACES

(71) Applicant: SUPERC-TOUCH CORPORATION, New Taipei (TW)

(72) Inventors: Hsiang-Yu Lee, New Taipei (TW); Shang Chin, New Taipei (TW); Ping-Tsun Lin, New Taipei (TW)

(73) Assignee: SUPERC-TOUCH CORPORATION, New Taipei (TW)

(*) Notice: Subject to any disclaimer, the term of this patent is extended or adjusted under 35 U.S.C. 154(b) by 57 days.

(21) Appl. No.: 15/582,570

(22) Filed: Apr. 28, 2017

(65) Prior Publication Data
US 2017/0336900 A1  Nov. 23, 2017

(30) Foreign Application Priority Data
May 19, 2016  (TW) .............................. 105115613 A

(51) Int. Cl.
*G06F 3/041* (2006.01)
*G06F 3/044* (2006.01)

(52) U.S. Cl.
CPC ............ *G06F 3/0414* (2013.01); *G06F 3/044* (2013.01); *G06F 3/0416* (2013.01); *G06F 2203/04107* (2013.01); *G06F 2203/04112* (2013.01)

(58) Field of Classification Search
CPC .................. G06F 3/0414; G06F 3/044; G06F 2203/04103; G06F 2203/04105
See application file for complete search history.

(56) References Cited

U.S. PATENT DOCUMENTS

| 2007/0229464 A1 | 10/2007 | Hotelling et al. |
| 2011/0057899 A1* | 3/2011 | Sleeman ................. G01L 1/146 345/174 |
| 2013/0044074 A1* | 2/2013 | Park .................... G02F 1/13338 345/174 |

(Continued)

FOREIGN PATENT DOCUMENTS

| TW | 201211849 A | 3/2012 |
| TW | M520681 U | 4/2016 |

OTHER PUBLICATIONS

Office Action dated Sep. 1, 2016 of the corresponding Taiwan patent application.

*Primary Examiner* — Yuzhen Shen
(74) *Attorney, Agent, or Firm* — Chung-Ming Shih; HLDS IPR Services

(57) ABSTRACT

A force-touch sensing apparatus with metal traces includes an upper substrate, a metal trace layer, a transparent touch-electrode layer, an insulating layer, a transparent force-electrode layer, a resilient dielectric material layer, and a capacitance sensing circuit. The capacitance sensing circuit sequentially or randomly applies a touch capacitance-exciting signal to a selected transparent touch sensing electrode and receives a touch sensing signal from the selected transparent touch sensing electrode for a touch sensing operation. The capacitance sensing circuit applies a force capacitance-exciting signal to the at least one transparent force sensing electrode, and sequentially or randomly applies a counter-exciting signal to the transparent touch sensing electrode and receives a force sensing signal from the at least one transparent force sensing electrode for a force sensing operation.

25 Claims, 12 Drawing Sheets

(56) References Cited

U.S. PATENT DOCUMENTS

| | | |
|---|---|---|
| 2014/0293145 A1 | 10/2014 | Jones et al. |
| 2014/0320761 A1* | 10/2014 | Misaki .................... G06F 3/044 349/12 |
| 2015/0123933 A1* | 5/2015 | Jang ........................ G06F 3/044 345/174 |
| 2017/0045992 A1* | 2/2017 | Lee ....................... G06F 3/0416 |
| 2017/0235414 A1* | 8/2017 | Ding ....................... G06F 3/047 345/174 |
| 2017/0242524 A1* | 8/2017 | Kim ...................... G06F 3/0416 |
| 2017/0269773 A1* | 9/2017 | Suzuki ................. G06F 3/0416 |
| 2017/0322662 A1* | 11/2017 | Hsieh .................. G02B 6/0088 |

\* cited by examiner

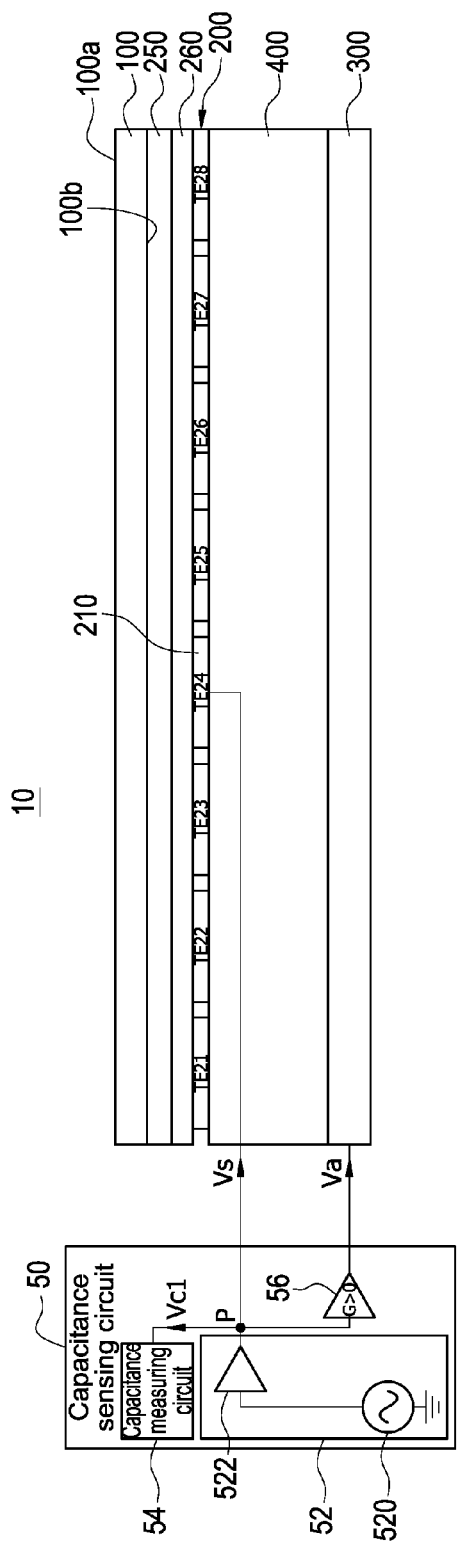
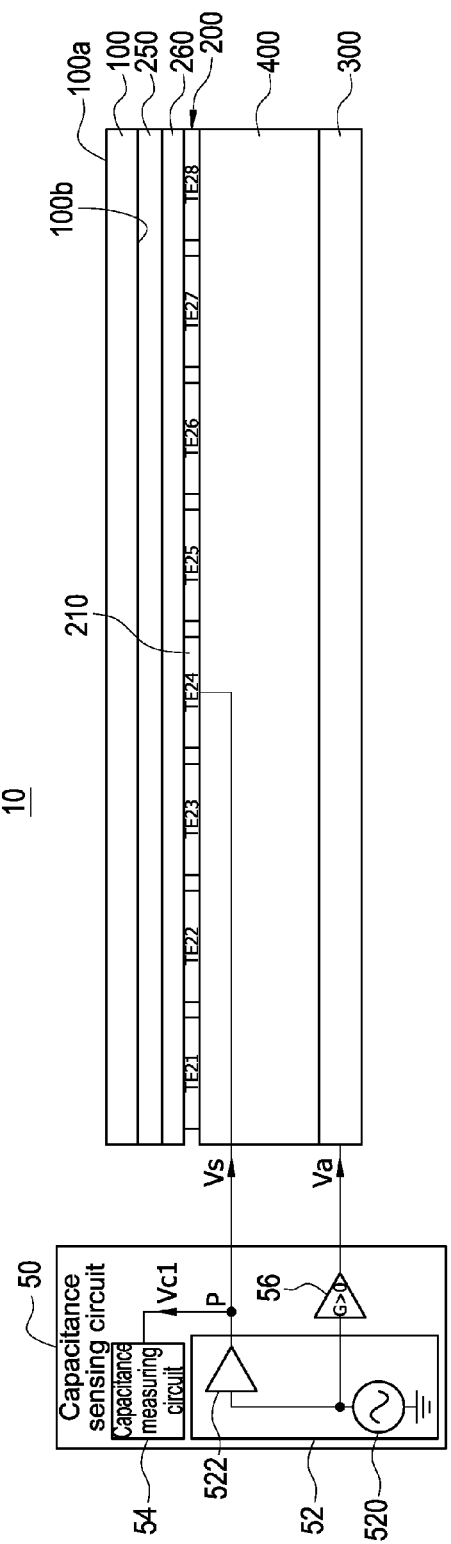
FIG.5A
FIG.5B

FORCE-TOUCH SENSING APPARATUS WITH METAL TRACES

BACKGROUND

Technical Field

The present invention relates to a force-touch sensing apparatus, and more particularly to a force-touch sensing apparatus with metal traces.

Description of Related Art

The touch display panels become popular as the market growing of the compact and lightweight mobile device. The force touch control technology has rapid development owing to the maturity of touch-control user interface and serious demand for 3D touch operation. The conventional force touch-control panel generally integrates microelectromechanical sensor at edge or corner of the display panel to sense touch force on the display panel. The cost of the sensor is high and the assembling of the sensor is difficult. Besides, the conventional force touch-control panel uses deformable resilient microstructure formed by complicated process to get better relevance between force and deformed degree. The force sensing can be improved by augmented physical variation. However, it still needs lots of effort to improve the force touch-control panel.

SUMMARY

It is an object of the present invention to provide a touch sensing apparatus with metal traces to overcome above mentioned drawbacks.

Accordingly, the present invention provides a touch sensing apparatus with metal traces. The touch sensing apparatus with metal traces includes an upper substrate, a metal trace layer, a transparent touch-electrode layer, an insulating layer, a transparent force-electrode layer, a resilient dielectric material layer, and a capacitance sensing circuit. The metal trace layer is arranged on a surface of the upper substrate, and the metal trace layer includes a plurality of metal traces. The transparent touch-electrode layer is arranged on a side of the metal trace layer, and the transparent touch-electrode layer includes a plurality of transparent touch sensing electrodes. The insulating layer is arranged between the metal trace layer and the transparent touch-electrode layer. The transparent force-electrode layer is arranged on a side of the transparent touch-electrode layer opposite to the insulating layer, and the transparent force-electrode layer includes at least one transparent force sensing electrode. The resilient dielectric material layer is arranged between the transparent touch-electrode layer and the transparent force-electrode layer. The capacitance sensing circuit sequentially or randomly applies a touch capacitance-exciting signal to a selected transparent touch sensing electrode and receives a touch sensing signal from the selected transparent touch sensing electrode for a touch sensing operation. The capacitance sensing circuit further applies a force capacitance-exciting signal to the at least one transparent force sensing electrode, and sequentially or randomly applies a counter-exciting signal to the selected transparent touch sensing electrode and receives a force sensing signal from the at least one transparent force sensing electrode for a force sensing operation.

Accordingly, the present invention provides a force-touch sensing apparatus with metal traces. The force-touch sensing apparatus with metal traces includes an upper substrate, a touch-electrode layer with metal traces, a transparent force-electrode layer, a resilient dielectric material layer, and a capacitance sensing circuit. The touch-electrode layer with metal traces is arranged on a surface of the upper substrate, and the touch-electrode layer with metal trace includes a plurality of coplanar metal traces and a plurality of transparent touch sensing electrodes. The transparent force-electrode layer is arranged on a side of the touch-electrode layer with metal traces, and the transparent force-electrode layer includes at least one transparent force sensing electrode. The resilient dielectric material layer is arranged between the touch-electrode layer with metal traces and the transparent force-electrode layer. The resilient dielectric material layer includes a resilient gelatinous material, and the resilient gelatinous material is compressively deformed under force and restores to original shape and volume if force is not present. The capacitance sensing circuit sequentially or randomly applies a touch capacitance-exciting signal to a selected transparent touch sensing electrode and receives a touch sensing signal from the selected transparent touch sensing electrode for a touch sensing operation. The capacitance sensing circuit further applies a force capacitance-exciting signal to the at least one transparent force sensing electrode, and sequentially or randomly applies a counter-exciting signal to the selected transparent touch sensing electrode and receives a force sensing signal from the at least one transparent force sensing electrode for a force sensing operation. An overlap percentage between a sum of a projection area of the transparent touch sensing electrodes and the coplanar metal traces and a projection area of the at least one transparent force sensing electrode is not less than 90%.

The force-touch sensing apparatus with metal traces of the present invention is provided to increase the display uniformity since the metal traces and the touch-electrode layer are coplanar or overlapped with each other.

It is to be understood that both the foregoing general description and the following detailed description are exemplary, and are intended to provide further explanation of the present invention as claimed. Other advantages and features of the present invention will be apparent from the following description, drawings and claims.

BRIEF DESCRIPTION OF DRAWING

The present invention can be more fully understood by reading the following detailed description of the embodiment, with reference made to the accompanying drawings as follows:

FIG. 5A shows a schematic view of the force-touch sensing apparatus with metal traces according to another embodiment of the present invention.

FIG. 5B shows a schematic view of the force-touch sensing apparatus with metal traces according to another embodiment of the present invention.

DETAILED DESCRIPTION

Figure 1A:
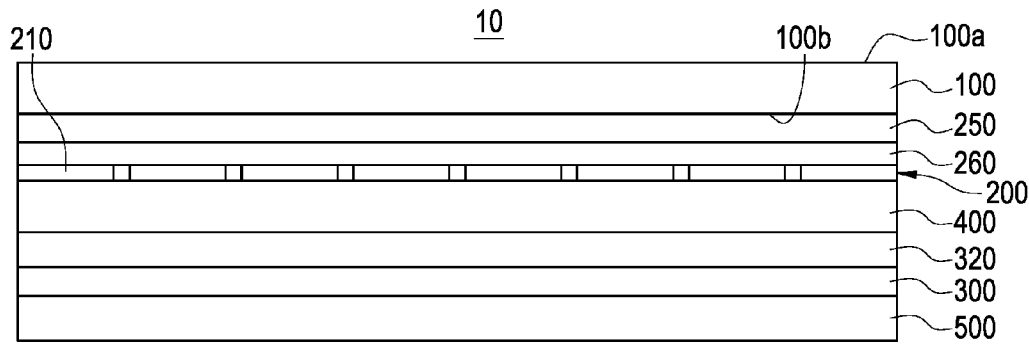
FIG. 1A shows a stack diagram of a force-touch sensing apparatus with metal traces according to an embodiment of the present invention.

Reference will now be made to the drawing figures to describe the present invention in detail. It will be understood that the drawing figures and exemplified embodiments of present invention are not limited to the details thereof.

Refer to FIG. 1A, which shows a stack diagram of a force-touch sensing apparatus with metal traces according to an embodiment of the present invention. The force-touch sensing apparatus with metal traces 10 includes, from top to bottom, an upper substrate 100, a metal trace layer 250, an insulating layer 260, a transparent touch-electrode layer 200, a resilient dielectric material layer 400, a polarizing layer 320, a transparent force-electrode layer 300, and a lower substrate 500. The upper substrate 100 includes a first surface 100a and a second surface 100b. The metal trace layer 250 is arranged on the second surface 100b of the upper substrate 100, and the metal trace layer 250 includes a plurality of metal traces. The transparent touch-electrode layer 200 is arranged on a side of the metal trace layer 250 opposite to the upper substrate 100. The transparent touch-electrode layer 200 includes a plurality of transparent touch sensing electrodes 210. It should be noted that FIG. 1A only shows a stack diagram, the arrangement and distribution of the transparent touch sensing electrodes 210 can be varied. The insulating layer 260 is arranged between the metal trace layer 250 and the transparent touch-electrode layer 200. The transparent force-electrode layer 300 is arranged on a side of the transparent touch-electrode layer 200 opposite to the upper substrate 100, and the transparent force-electrode layer 300 includes at least one transparent force sensing electrode. The resilient dielectric material layer 400 is arranged between the transparent touch-electrode layer 200 and the transparent force-electrode layer 300. The polarizing layer 320 is arranged on a side of the resilient dielectric material layer 400 opposite to the transparent touch-electrode layer 200. The lower substrate 500 is arranged on a side of the transparent force-electrode layer 300 opposite to the polarizing layer 320.

Figure 1B:
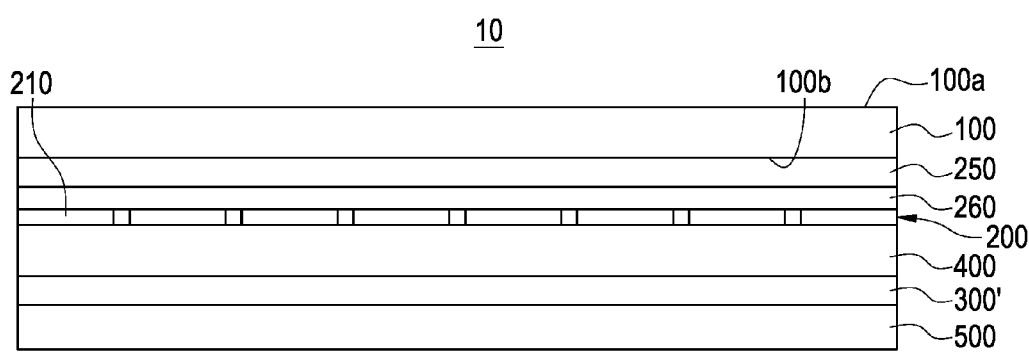
FIG. 1B shows a stack diagram of the force-touch sensing apparatus with metal traces according to another embodiment of the present invention.
Figure 1C:
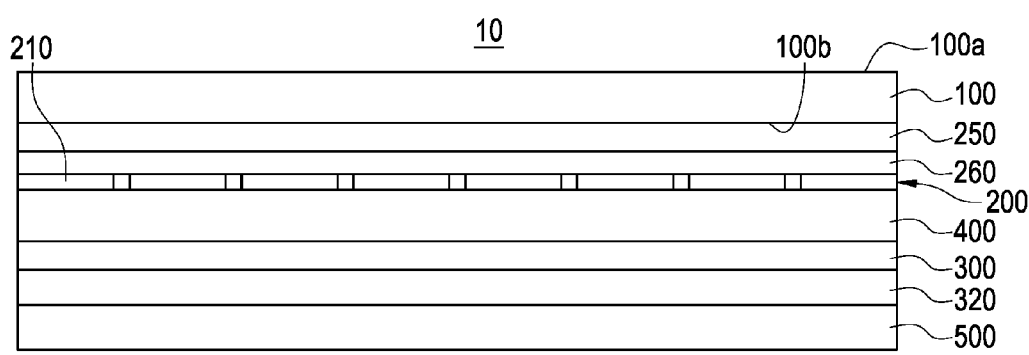
FIG. 1C shows a stack diagram of the force-touch sensing apparatus with metal traces according to another embodiment of the present invention.

Refer to FIG. 1B and FIG. 1C, which show stack diagrams of the force-touch sensing apparatus with metal traces according to different embodiments of the present invention. The embodiment shown in FIG. 1B is similar to that shown in FIG. 1A. In this embodiment, the transparent force-electrode layer 300 may be a transparent force-electrode layer 300' with polarizer function, and the transparent force-electrode layer 300' is arranged between the resilient dielectric material layer 400 and the lower substrate 500. The embodiment shown in FIG. 1C is similar to that shown in FIG. 1A. In this embodiment, however, the locations of the polarizing layer 320 and the transparent force-electrode layer 300 are exchanged. Accordingly, the force-touch sensing apparatus with metal traces 10 includes, from top to bottom, an upper substrate 100, a metal trace layer 250, an insulating layer 260, a transparent touch-electrode layer 200, a resilient dielectric material layer 400, a transparent force-electrode layer 300, a polarizing layer 320, and a lower substrate 500.

Refer to FIG. 5A, which shows a schematic view of the force-touch sensing apparatus with metal traces according to another embodiment of the present invention. The force-touch sensing apparatus with metal traces 10 can be referred to an embodiment shown in FIG. 1C, and the polarizing layer 320 and the lower substrate 500 are omitted in FIG. 5A for simplified demonstration. As shown in FIG. 5A, the transparent touch-electrode layer 200 includes a plurality of transparent touch sensing electrodes 210 (such as transparent touch sensing electrodes TE21-TE28). It should be noted that FIG. 5A only shows a stack diagram, the arrangement and distribution of the transparent touch sensing electrodes 210 can be varied. The force-touch sensing apparatus with metal traces 10 further includes a capacitance sensing circuit 50, and the capacitance sensing circuit 50 includes a capacitance-excitation driving circuit 52 and a capacitance measuring circuit 54.

The capacitance-excitation driving circuit 52 includes a signal source 520 and a driving unit 522, and the capacitance-excitation driving circuit 52 sequentially or randomly applies a touch capacitance-exciting signal Vs to a selected transparent touch sensing electrode, such as a transparent touch sensing electrode TE24. Moreover, the capacitance-excitation driving circuit 52 further transmits the touch capacitance-exciting signal Vs to a non-inverting amplifier 56, and preferably a gain of the non-inverting amplifier 56 is one. Also, an auxiliary signal Va having the same phase as that of the touch capacitance-exciting signal Vs is produced from the non-inverting amplifier 56, and the auxiliary signal Va is applied to at least one transparent force sensing electrode. By applying a signal having the same phase as that of the touch capacitance-exciting signal Vs on the at least one transparent force sensing electrode, equivalently there is minute (or even no) voltage difference between the selected transparent touch sensing electrode TE24 and the corresponding at least one transparent force sensing electrode. Therefore, there is minute (or even no) capacitance between the selected transparent touch sensing electrode TE24 and the corresponding at least one transparent force sensing electrode. The influence to capacitance measurement due to warp of the resilient dielectric material layer 400 can be prevented when sensing a touch operation for the selected transparent touch sensing electrode TE24. Moreover, the influence to capacitance measurement due to parallel capacitance from the corresponding at least one transparent force sensing electrode and the ground point can also be prevented.

Refer to FIG. 5B, which shows a schematic view of the force-touch sensing apparatus with metal traces according to another embodiment of the present invention. However, in this embodiment, the input of the non-inverting amplifier 56 of the capacitance sensing circuit 50 for generating the auxiliary signal Va is not connected to a sensing point P at the input of the capacitance measuring circuit 54 (for example, the input of the non-inverting amplifier 56 is directly connected to the signal source 520) to prevent the influence from a touch sensing signal Vc1 at the sensing point P of the capacitance measuring circuit 54. Moreover, in a touch sensing operation, the capacitance sensing circuit 50 further applies a reflection signal (not shown) having the same phase as that of the touch capacitance-exciting signal Vs to non-selected transparent touch sensing electrodes near the selected transparent touch sensing electrode TE24, such as transparent touch sensing electrodes TE21-TE23, TE25-TE28 such that sensing electric lines are focused on the selected transparent touch sensing electrode TE24, thus enhancing sensitivity and accuracy of touch sensing for the selected transparent touch sensing electrode TE24.

Figure 6:
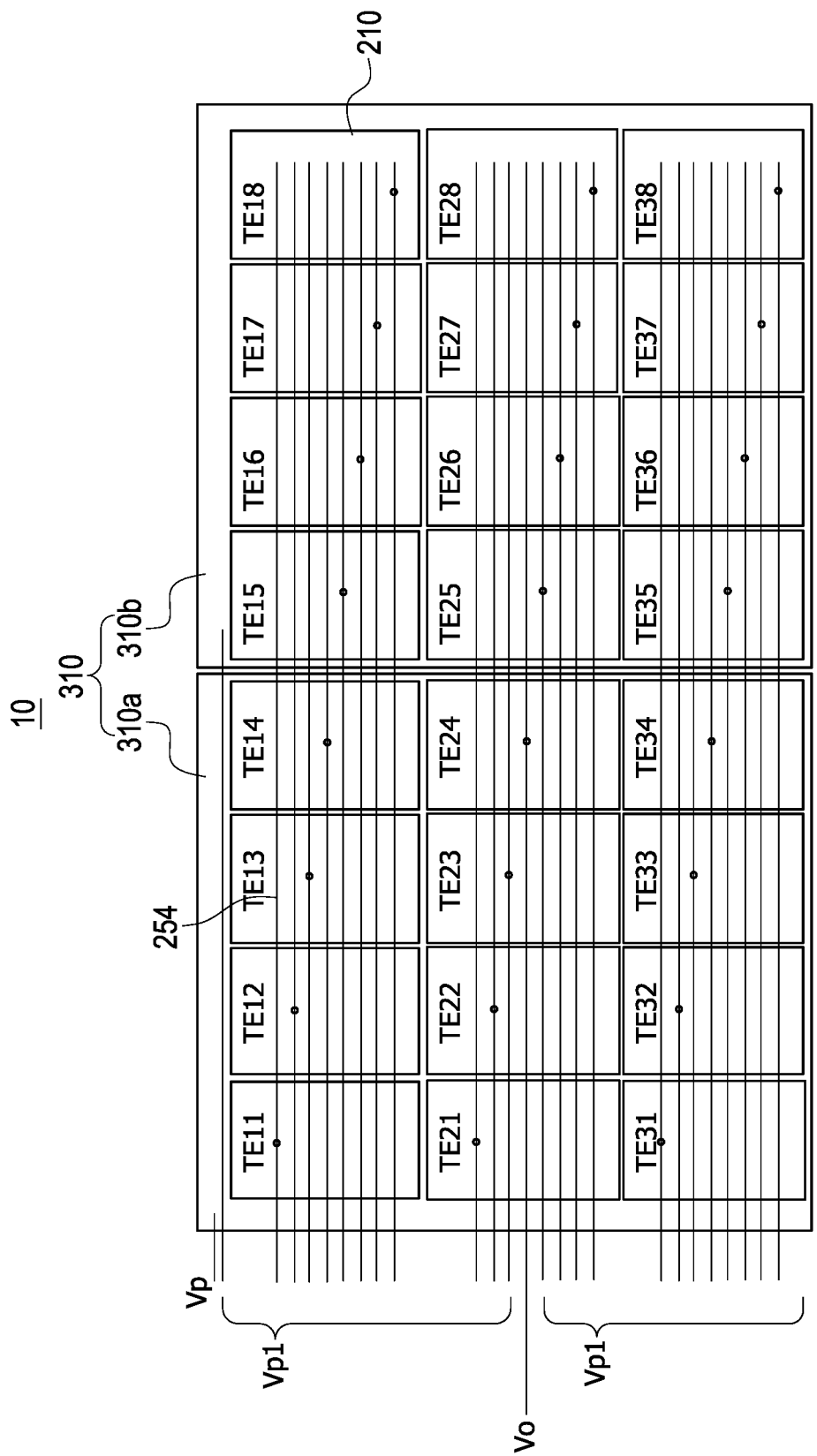
FIG. 6 shows a partial top view of the force-touch sensing apparatus with metal traces according to an embodiment of the present invention.

Refer to FIG. 6, which shows a partial top view of the force-touch sensing apparatus with metal traces according to an embodiment of the present invention, which mainly depicts the distribution of the transparent touch sensing electrodes TE11-TE18, TE21-TE28, TE31-TE38, the metal traces 254, and the transparent force sensing electrode 310. As shown in FIG. 6, the projections of the metal traces 254 pass through the transparent touch-electrode layer 200 in parallel so that the metal traces 254 are electrically connected to the transparent touch sensing electrodes TE11-TE18, TE21-TE28, TE31-TE38, respectively, through via holes (not shown) in the insulating layer 260. Namely, each of the metal traces 254 is electrically connected to one of the transparent touch sensing electrodes through the insulating layer 260. The metal traces 254 generally have the same length. In other words, the metal traces 254 still maintain substantially the same length even if the metal traces 254 have been electrically connected to the corresponding transparent touch sensing electrodes and the projection thereof pass through a complete row of the transparent touch-electrode layer 200. For example, the transparent force-electrode layer 300 includes two transparent force sensing electrodes 310a, 310b, and each of the transparent touch sensing electrodes TE11-TE18, TE21-TE28, TE31-TE38 is corresponding to at least one of the transparent force sensing electrodes 310a, 310b. The "correspondence" means each of the transparent touch sensing electrodes TE11-TE18, TE21-TE28, TE31-TE38 is at least overlapped with one corresponding transparent force sensing electrode 310 from projected view, or near the one corresponding transparent force sensing electrode 310 from projected view, thus avoiding the influence due to warp of the resilient dielectric material layer 400. For example, the corresponding transparent force sensing electrode for the selected transparent touch sensing electrode TE24 is the transparent force sensing electrode 310a. The above mentioned example is only for exemplary purpose and not for limitation of the present invention.

Figure 3A:
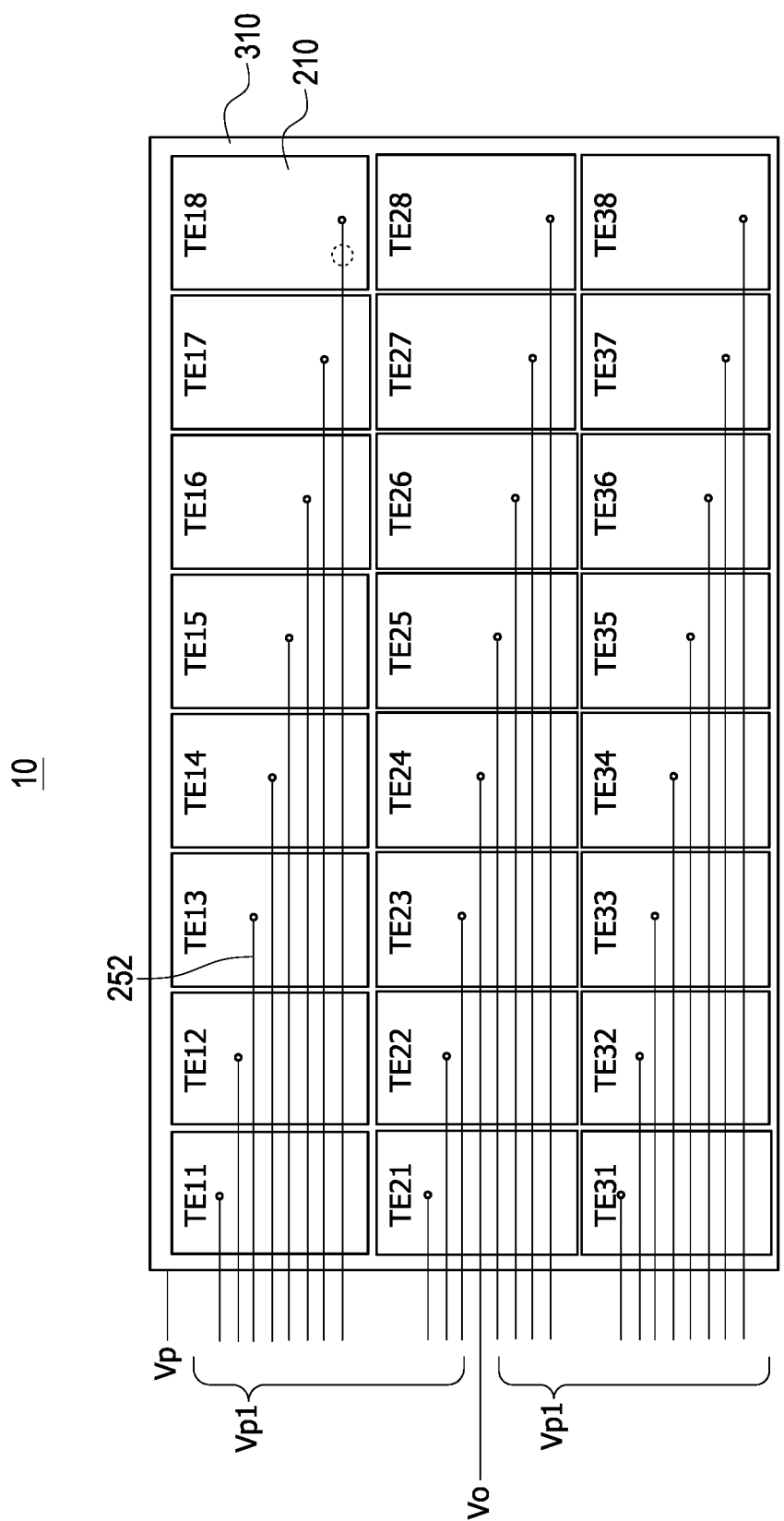
FIG. 3A shows a top view of the force-touch sensing apparatus with metal traces according to an embodiment of the present invention.
Figure 3B:
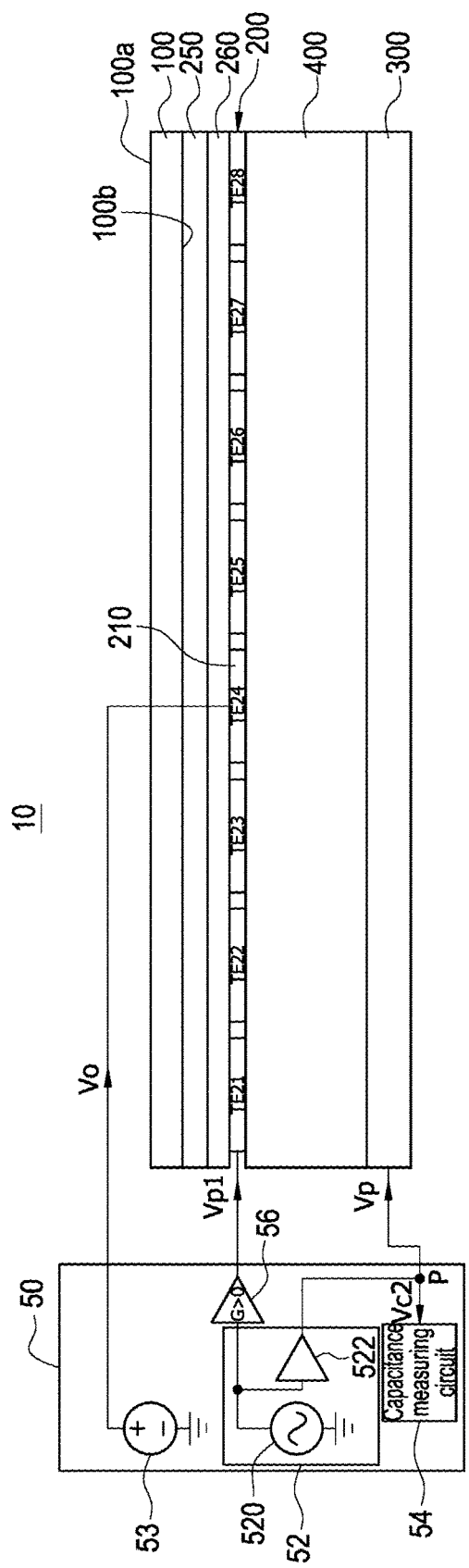
FIG. 3B shows a schematic view of the force-touch sensing apparatus with metal traces according to an embodiment of the present invention.

Refer to FIG. 3A and FIG. 3B, which show top views of the force-touch sensing apparatus with metal traces in a force sensing operation according to different embodiments of the present invention. The force sensing operation of the force-touch sensing apparatus with metal traces 10 may be immediately performed after the touch sensing operation described in FIG. 5A. For example, after the touch sensing operation of the selected transparent touch sensing electrode TE24 is completed, the force sensing operation of the transparent force sensing electrodes corresponding to the selected transparent touch sensing electrode TE24 is performed. As shown in FIG. 3A, the transparent force sensing electrode corresponding to the selected transparent touch sensing electrode TE24 is the transparent force sensing electrode 310 (or is the transparent force sensing electrode 310a shown in FIG. 6). Therefore, as shown in FIG. 3B, the capacitance sensing circuit 50 applies a force capacitance-exciting signal Vp to the transparent force sensing electrode 310 for sensing force. The capacitance sensing circuit 50 of the force-touch sensing apparatus with metal traces 10 has a non-inverting amplifier 56, and preferably a gain of the non-inverting amplifier 56 is one. Also, a shielding signal Vp1 having the same phase as that of the force capacitance-exciting signal Vp is produced from the non-inverting amplifier 56, and the shielding signal Vp1 is applied to the non-selected transparent touch sensing electrodes TE11-TE18, TE21-TE23, TE25-TE28, TE31-TE38 shown in FIG. 3A, namely at least part of other transparent touch sensing electrodes other than the selected transparent touch sensing electrode TE24. Moreover, the capacitance sensing circuit 50 of the force-touch sensing apparatus with metal traces 10 provides a DC reference signal source 53, and the DC reference signal source 53 produces a DC reference signal to be as a counter-exciting signal Vo. The capacitance sensing circuit 50 sequentially or randomly applies the counter-exciting signal Vo to a selected transparent touch sensing electrode such as the electrode TE24 in the force sensing operation.

With reference also to FIG. 3A, which shows a partial top view of the force-touch sensing apparatus with metal traces according to an embodiment of the present invention, which mainly depicts the distribution of the transparent touch sensing electrodes TE11-TE18, TE21-TE28, TE31-TE38, the metal traces 252, and the transparent force sensing electrode 310 as well as the application manner of the force capacitance-exciting signal Vp, the shielding signal Vp1, and the counter-exciting signal Vo. The embodiment shown in FIG. 3A is similar to that shown in FIG. 6. In this embodiment, the length of metal traces 252 are different since the metal traces 252 are electrically connected to the corresponding transparent touch sensing electrodes but not all of the projections thereof pass through a complete row of the transparent touch-electrode layer 200. Also, the transparent force-electrode layer 300 includes only one transparent force sensing electrode 310.

With reference also to FIG. 3B, in the force sensing operation, the shielding signal Vp1 having the same phase as that of the force capacitance-exciting signal Vp is applied to the non-selected transparent touch sensing electrodes (such as at least part of transparent touch sensing electrodes other than the selected transparent touch sensing electrode TE24) to shield the influence from user's finger and enhance accuracy of force sensing for the selected transparent touch sensing electrode TE24. Moreover, the counter-exciting signal Vo with a predetermined voltage level is applied to the selected transparent touch sensing electrode TE24 to enhance sensitivity of force sensing for the transparent force sensing electrode corresponding to the selected transparent touch sensing electrode TE24. In this embodiment, the input of the non-inverting amplifier 56 of the capacitance sensing circuit 50 for generating the shielding signal Vp1 is not connected to the sensing point P at the input of the capacitance measuring circuit 54 (for example, the input of the non-inverting amplifier 56 is directly connected to the signal source 520) to prevent the influence from a force sensing signal Vc2 at the sensing point P of the capacitance measuring circuit 54, thus precisely determining whether a pressing action is present and the amount of pressing force.

Figure 4A:
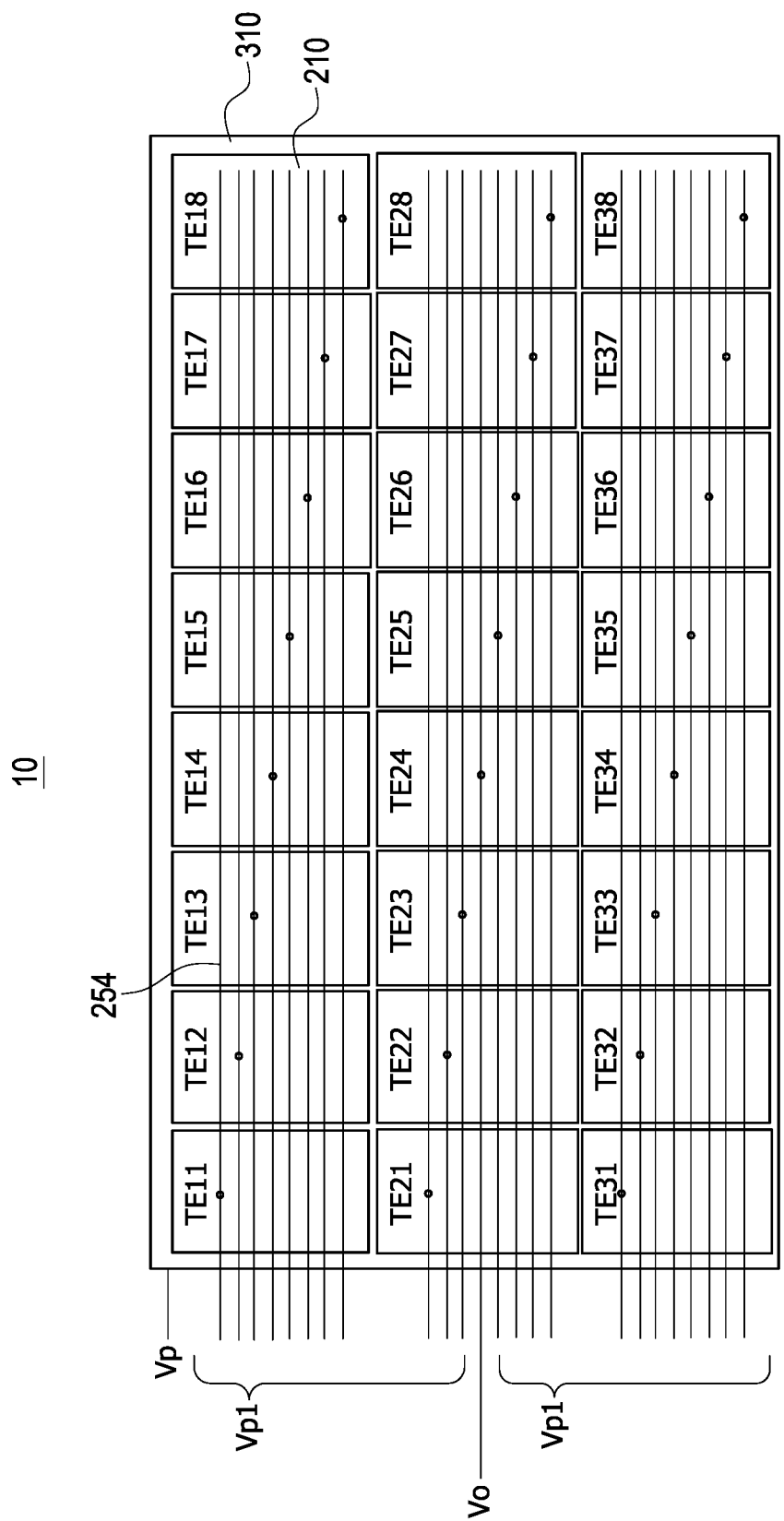
FIG. 4A shows a top view of the force-touch sensing apparatus with metal traces according to another embodiment of the present invention.
Figure 4B:
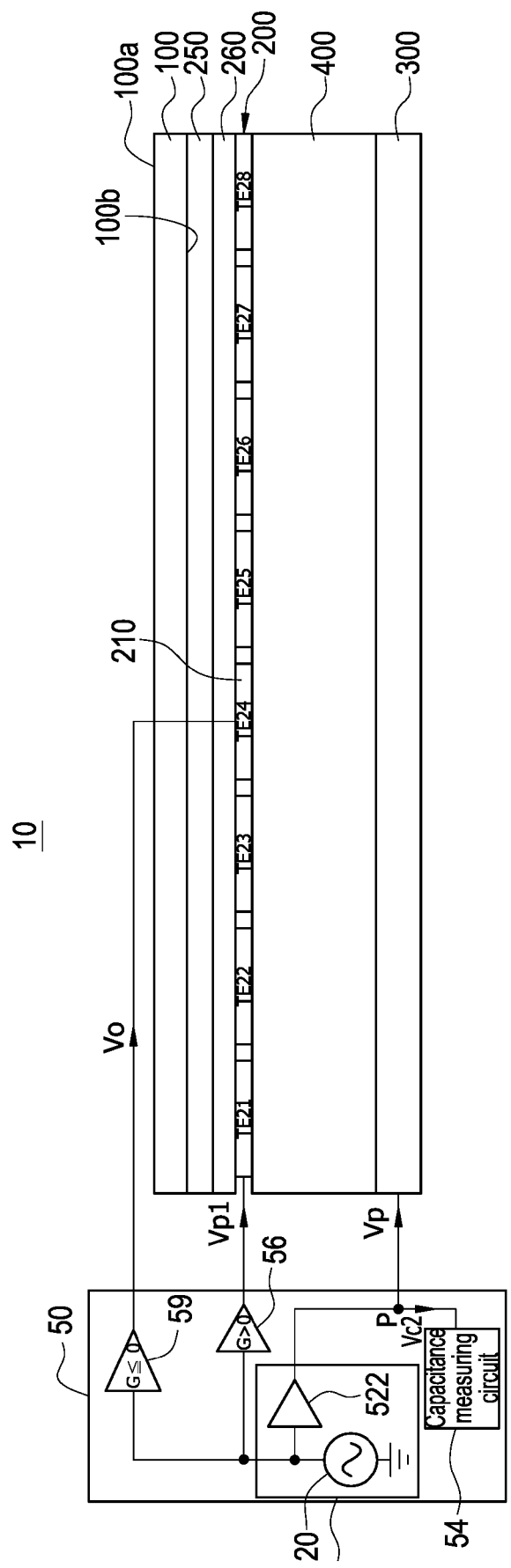
FIG. 4B shows a schematic view of the force-touch sensing apparatus with metal traces according to another embodiment of the present invention.

Refer to FIG. 4A and FIG. 4B, which show a top view and a schematic view of the force-touch sensing apparatus with metal traces according to another embodiment of the present invention, respectively. The force-touch sensing apparatus with metal traces 10 is in the force sensing operation. The embodiment shown in FIG. 4A is similar to that shown in FIG. 6. However, in this embodiment, the transparent force-electrode layer 300 includes only one transparent force sensing electrode 310. The embodiment shown in FIG. 4B is similar to that shown in FIG. 3B. However, in this embodiment, the capacitance sensing circuit 50 has an inverting amplifier 59 to replace the DC reference signal source 53. In other words, the force-touch sensing apparatus with metal traces 10 uses the inverting amplifier 59 to generate a counter-exciting signal Vo with phase opposite to that of the force capacitance-exciting signal Vp for enhancing accuracy of force sensing for the transparent force sensing electrode. However, in this embodiment, the input of the non-inverting amplifier 56 for generating the shielding signal Vp1 is not connected to the input of the capacitance sensing circuit 50 (for example, the input of the non-inverting amplifier 56 is directly connected to the signal source 520) to prevent the influence from the force sensing signal Vc2 at the input point P of the capacitance measuring circuit 54.

Figure 2A:
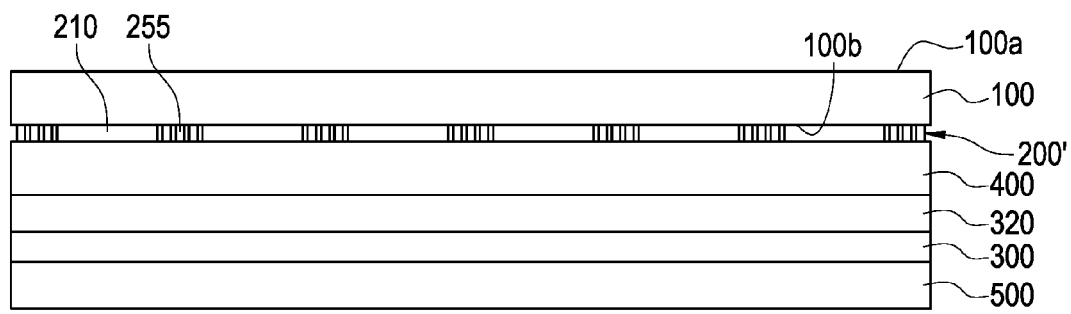
FIG. 2A shows a stack diagram of the force-touch sensing apparatus with metal traces according to another embodiment of the present invention.
Figure 2B:
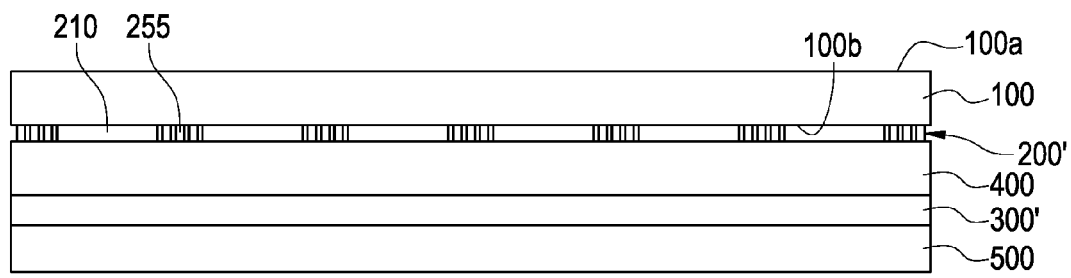
FIG. 2B shows a stack diagram of the force-touch sensing apparatus with metal traces according to another embodiment of the present invention.
Figure 2C:
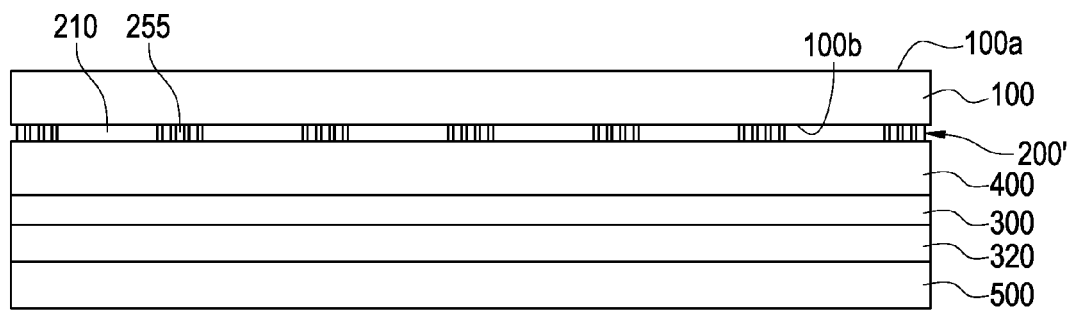
FIG. 2C shows a stack diagram of the force-touch sensing apparatus with metal traces according to another embodiment of the present invention.

Refer to FIG. 2A, FIG. 2B, and FIG. 2C, which show stack diagrams of the force-touch sensing apparatus with metal traces according to different embodiment of the present invention. The embodiment of the force-touch sensing apparatus with metal traces 10 shown in FIG. 2A is similar to that shown in FIG. 1A. In this embodiment, however, the transparent touch-electrode layer 200 and the metal trace layer 250 shown in FIG. 1A are replaced by a touch-electrode layer with metal traces 200' so that the insulating layer 260 can be omitted. Moreover, the transparent touch sensing electrodes 210 and the coplanar metal traces 255 are coplanar with each other. The embodiment shown in FIG. 2B is similar to that shown in FIG. 2A. In this embodiment, however, the transparent force-electrode layer 300 is a transparent force-electrode layer 300' with polarizer function. The transparent force-electrode layer 300' is arranged between the resilient dielectric material layer 400 and the lower substrate 500. The embodiment shown in FIG. 2C is similar to that shown in FIG. 2A. In this embodiment, however, the locations of the polarizing layer 320 and the transparent force-electrode layer 300 are exchanged. Accordingly, the force-touch sensing apparatus with metal traces 10 includes, from top to bottom, an upper substrate 100, a touch-electrode layer with metal traces 200', a resilient dielectric material layer 400, a transparent force-electrode layer 300, a polarizing layer 320, and a lower substrate 500.

Figure 7A:
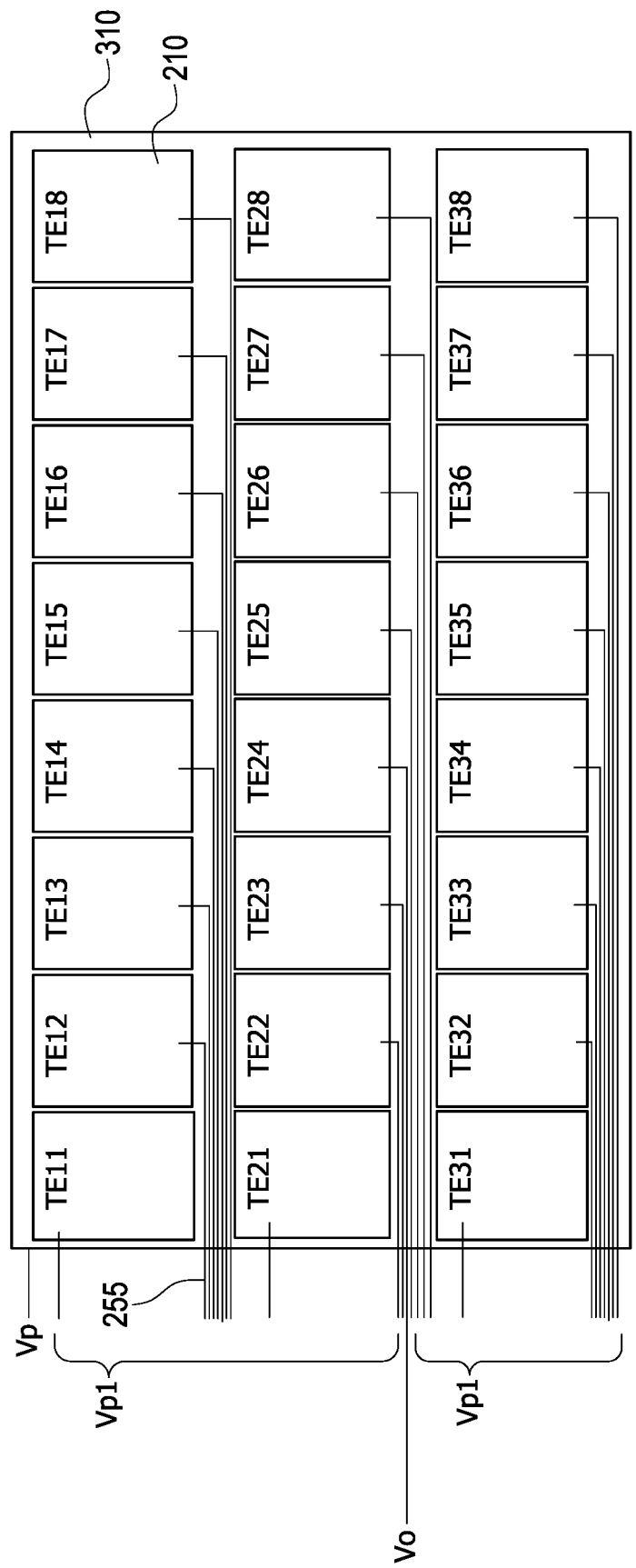
FIG. 7A shows a partial top view of the force-touch sensing apparatus with metal traces according to another embodiment of the present invention.
Figure 7B:
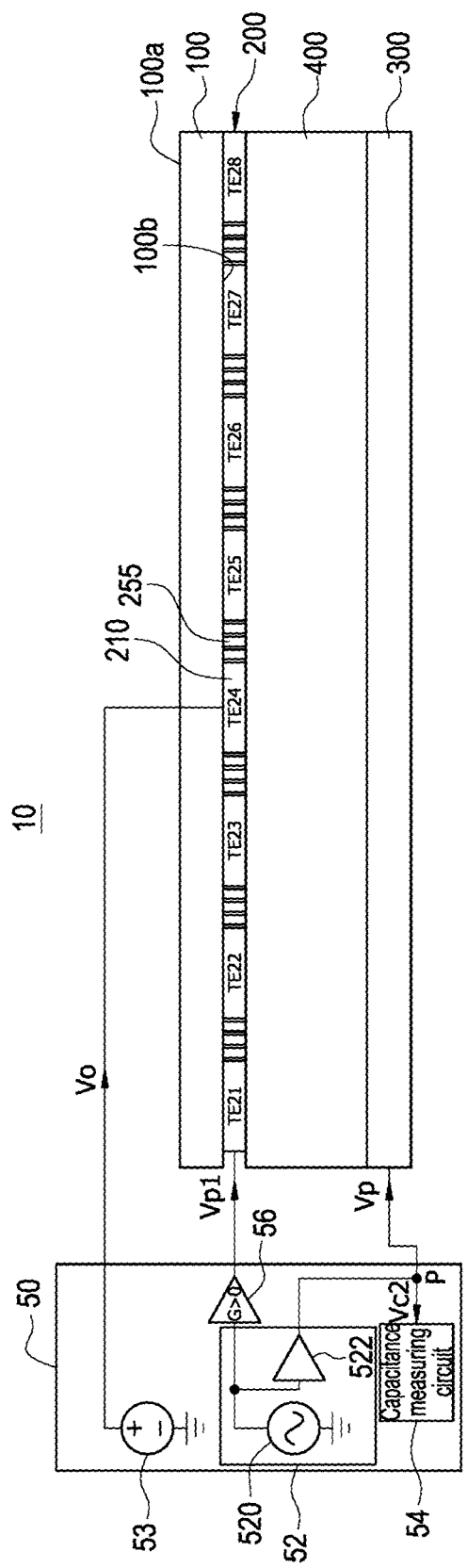
FIG. 7B shows a schematic view of the force-touch sensing apparatus with metal traces according to another embodiment of the present invention.

Refer to FIG. 7A and FIG. 7B, which show a partial top view and a schematic view of the force-touch sensing apparatus with metal traces in a force sensing operation according to another embodiment of the present invention, respectively. It is assumed that the force-touch sensing apparatus with metal traces 10 is executed as the touch sensing operation shown in FIG. 5A and FIG. 5B, and the transparent touch sensing electrode TE24 is selected. With reference to FIG. 7A, the transparent force sensing electrode corresponding to the transparent touch sensing electrode TE24 is the transparent force sensing electrode 310. Therefore, a force capacitance-exciting signal Vp is applied to the transparent force sensing electrode 310 for force sensing. The capacitance sensing circuit 50 of the force-touch sensing apparatus with metal traces 10 has a non-inverting amplifier 56, and preferably a gain of the non-inverting amplifier 56 is one. Also, a shielding signal Vp1 having the same phase as that of the force capacitance-exciting signal Vp is produced from the non-inverting amplifier 56, and the shielding signal Vp1 is applied to the non-selected transparent touch sensing electrodes TE11-TE18, TE21-TE23, TE25-TE28, TE31-TE38 shown in FIG. 7A, namely at least part of other transparent touch sensing electrodes other than the selected transparent touch sensing electrode TE24. Moreover, the capacitance sensing circuit 50 of the force-touch sensing apparatus with metal traces 10 provides a DC reference signal source 53, and the DC reference signal source 53 produces a DC reference signal to be as a counter-exciting signal Vo. The capacitance sensing circuit 50 sequentially or randomly applies the counter-exciting signal Vo to a selected transparent touch sensing electrode such as the electrode TE24.

With reference also to FIG. 7A, which shows a partial top view of the force-touch sensing apparatus with metal traces according to another embodiment of the present invention, which mainly depicts the distribution of the transparent touch sensing electrodes TE11-TE18, TE21-TE28, TE31-TE38, the metal traces 255, and the transparent force sensing electrode 310 as well as the application manner of the force capacitance-exciting signal Vp, the shielding signal Vp1, and the counter-exciting signal Vo. In this embodiment, the coplanar metal traces 255 and the transparent touch sensing electrodes TE11-TE38 are coplanar with each other, and the coplanar metal traces 255 are electrically connected to the corresponding transparent touch sensing electrodes. Also, the transparent force-electrode layer 300 includes only one transparent force sensing electrode 310.

With reference also to FIG. 7B, in the force sensing operation, the shielding signal Vp1 having the same phase as that of the force capacitance-exciting signal Vp is applied to the non-selected transparent touch sensing electrodes, such as at least part of other transparent touch sensing electrodes other than the selected transparent touch sensing electrode TE24 to shield the influence from user's finger and enhance accuracy of force sensing for the selected transparent touch sensing electrode TE24. Moreover, the counter-exciting signal Vo with a predetermined voltage level is applied to the selected transparent touch sensing electrode TE24 to enhance sensitivity of force sensing for the transparent force sensing electrode corresponding to the selected transparent touch sensing electrode TE24. In this embodiment, the input of the non-inverting amplifier 56 of the capacitance sensing circuit 50 for generating the shielding signal Vp1 is not connected to the sensing point P at the input of the capacitance measuring circuit 54 (for example, the input of the non-inverting amplifier 56 is directly connected to the signal source 520) to prevent the influence from a force sensing signal Vc2 at the sensing point P of the capacitance measuring circuit 54, thus precisely determining whether a pressing action is present and the amount of pressing force.

Figure 8B:
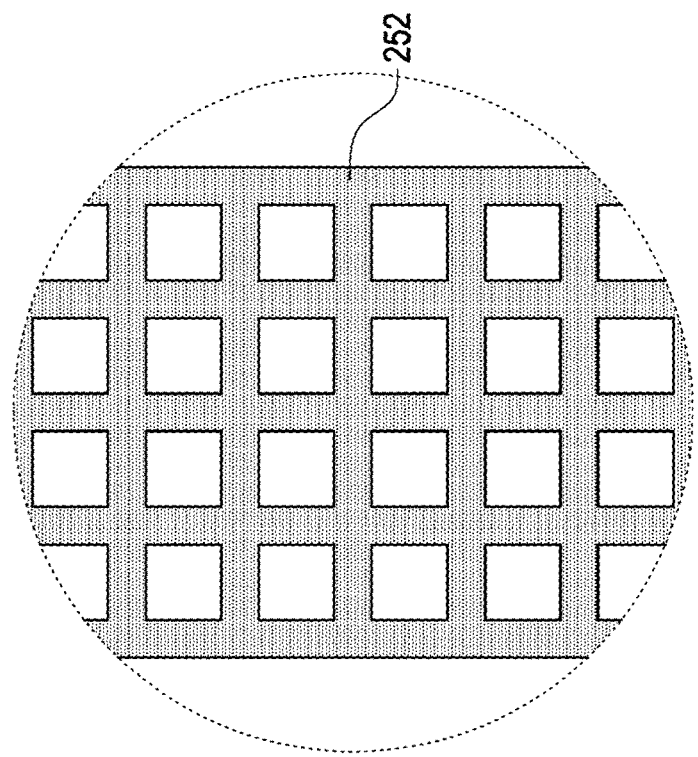
FIG. 8B shows a structural view of metal traces in detail according to another embodiment of the present invention.
Figure 8A:
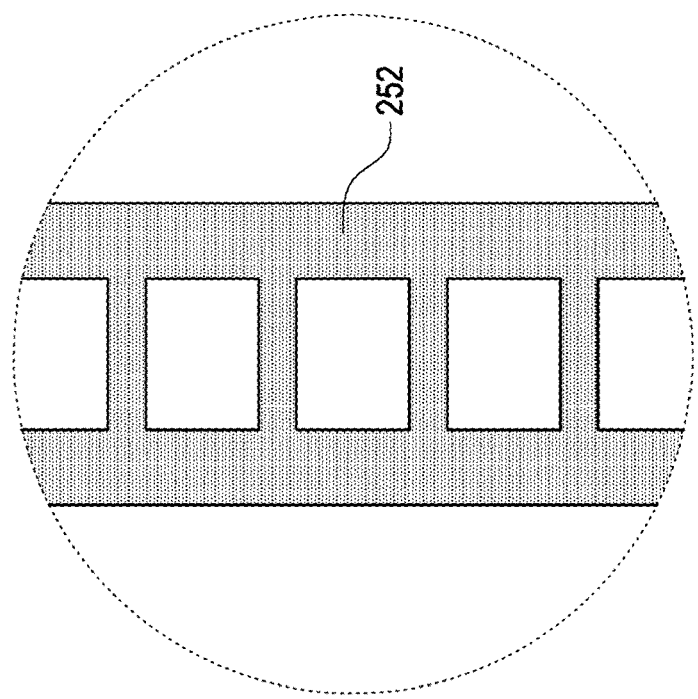
FIG. 8A shows a structural view of metal traces in detail according to an embodiment of the present invention.

Refer to FIG. 8A and FIG. 8, which show structural views of metal traces in detail according to different embodiments of the present invention. In other words, FIG. 8A and FIG. 8B show a partial enlarged view of the metal traces 252 of FIG. 3A. Although the metal traces 252 are illustrated like a signal line shown in FIG. 3A, the metal traces 252 are actually composed of at least one metal wire in the partial enlarged views. For example, the metal traces 252 are formed as ladder-shaped metal traces as shown in FIG. 8A. Namely, a plurality of middle metal wires is parallel to each other and two side metal wires are perpendicular to these middle metal wires. For example, the metal traces 252 are formed as mesh-shaped metal traces as shown in FIG. 8B. Namely, a plurality of metal wires is either parallel or perpendicular to each other. Accordingly, the ladder-shaped or mesh-shaped structure is provided to enhance ability and reliability of signal transmission if any one metal wire is disconnected. For example, if any one middle metal wire is disconnected in the ladder-shaped structure, signals still can be transmitted from one side metal wire to the other side metal through other middle metal wires. Moreover, the metal traces 252 may also be irregular-shaped metal traces formed by metal wires to reduce the visual influence and visual impact. Moreover, a width of the metal wire is preferably not greater than 50 micrometers. It should be noted that FIG. 8A and FIG. 8B only show schematic structural views; the detail structure of the metal wires can be varied.

Moreover, in the above-mentioned embodiments, the upper substrate 100 is a glass substrate, a polymer thin film substrate, or a cured coating layer to protect the touch sensing electrodes from damage due to scratch, collision or moisture. The force-control capacitance-exciting signal or the force capacitance-exciting signal may be an alternating signal such as sinusoid wave signal, square wave signal, triangular wave signal, or trapezoid wave signal. The force capacitance-exciting signal or the touch capacitance-exciting signal may be a current source. The counter-exciting signal may be a DC reference signal (for example a zero volt signal) or an alternating signal with phase opposite to that of the capacitance-exciting signal. The resilient dielectric material layer 400 has a resilient gelatinous material, the resilient gelatinous material is compressively deformed under force and restores to original shape and volume if force is not present. The resilient gelatinous material is, for example but not limited to, polydimethylsiloxane (PDMS), or optical clear adhesive (OCA). The traces may be made with black metal material (chromium alloy) or black resin metal material (by forming a black resin on the metal material) to reduce the light reflectivity of metal materials. The lower substrate 500 is a glass substrate or polymer substrate, or a color filter of a display screen. The capacitance sensing circuit is a self-capacitance sensing circuit. The transparent force sensing electrode layer is a static shielding layer of the display screen or a polarizing layer made with conductive material of the display screen. A gap between each transparent touch sensing electrode and the adjacent transparent touch sensing electrode is not greater than 500 micrometers (μm) and a gap between each transparent touch sensing electrode and the adjacent coplanar metal trace is not greater than 500 micrometers (μm), thereby providing excellent shielding performance and enhancing accuracy of force sensing for the at least one transparent force sensing electrode. Moreover, an overlap percentage between a sum of a projection area of the transparent touch sensing electrodes and the coplanar metal traces and a projection area of the at least one transparent force sensing electrode is not less than 90%.

Figure 9:
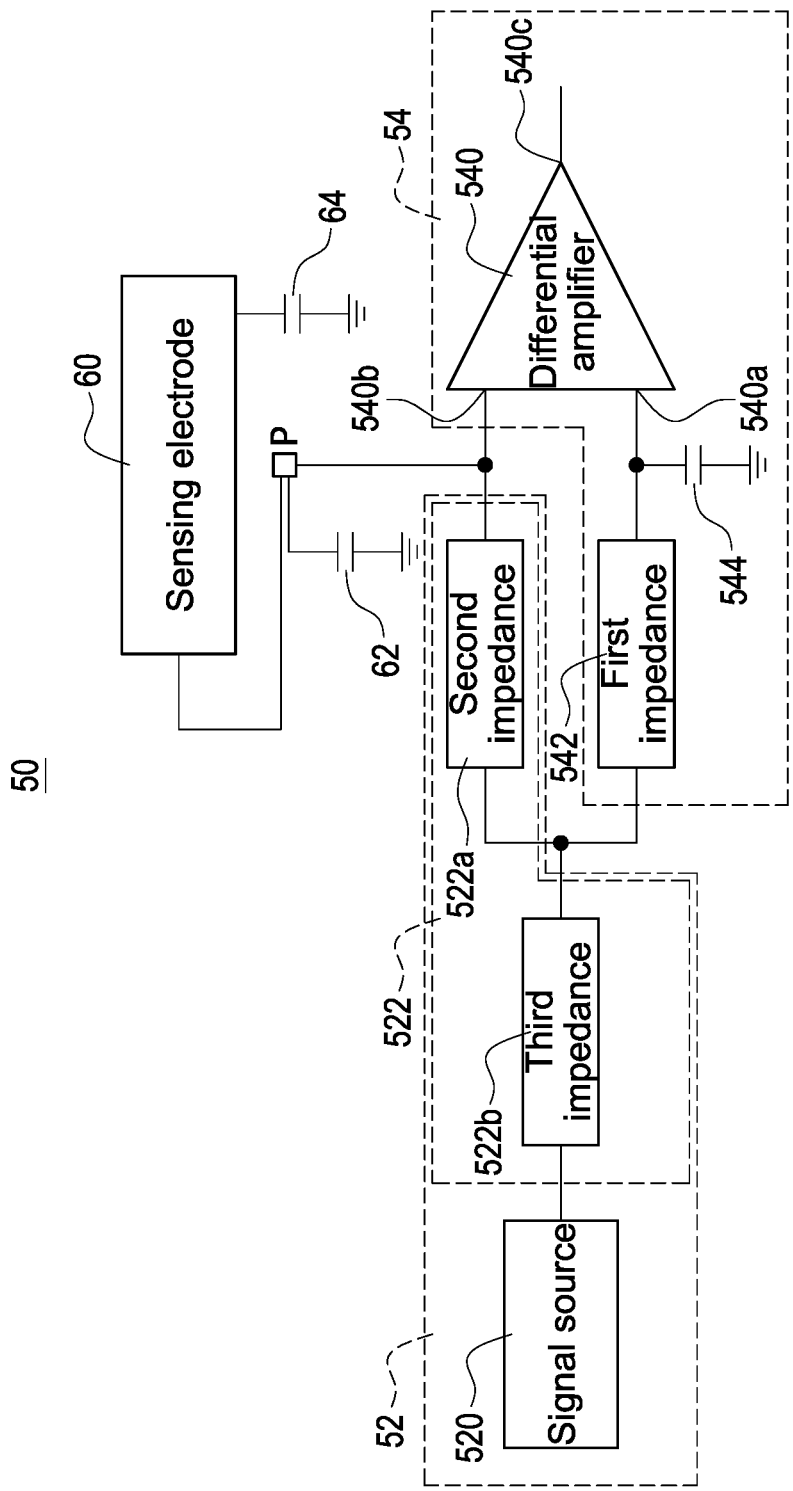
FIG. 9 shows a circuit diagram of a self-capacitance sensing circuit according to an embodiment of the present invention.

Refer to FIG. 9, which shows a circuit diagram of a self-capacitance sensing circuit according to an embodiment of the present invention. The capacitance sensing circuit 50 may be a self-capacitance sensing circuit. The capacitance sensing circuit 50 mainly includes a capacitance-excitation driving circuit 52 and a capacitance measuring circuit 54 to sense a capacitance change at a sensing point P. The capacitance-excitation driving circuit 52 includes a signal source 520 and a driving unit 522 (including a second impedance 522a and a third impedance 522b). The capacitance measuring circuit 54 includes a differential amplifier 540, a first impedance 542, and a first capacitor 544 and is used to sense a capacitance change at a sensing electrode 60, where the sensing electrode 60 has a first stray capacitance 62 and a second stray capacitance 64. The signal source 520 is electrically coupled to the first impedance 542 and the second impedance 522a. The first impedance 542 is electrically coupled to the first capacitor 544 and the first capacitor 544 is electrically coupled to the first input end 540a of the differential amplifier 540. The second impedance 522a is electrically coupled to the second input end 540b of the differential amplifier 540. The sensing electrode 60 is electrically coupled to the second impedance 522a and the second input end 540b through a node (such as an IC pin) of the capacitance sensing circuit 50. The first stray capacitance 62 is electrically coupled to the node and the second stray capacitance 64 is electrically coupled to the sensing electrode 60.

In the capacitance sensing circuit 50 shown in FIG. 9, the sensing electrode 60 receives a touch sensing signal when a finger or a conductor is touched thereon. The signal source 520 is a periodical signal and sent to the third impedance 522b, while the resistance values of the first impedance 542 and the second impedance 522a are identical. The differential amplifier 540 will generate a differential touch sensing signal after receiving the signal source 520 and the touch sensing signal from the sensing electrode 60. In this embodiment, the capacitance of the first capacitor 544 is equal to the resulting capacitance of the first stray capacitance 62 in parallel connection with the second stray capacitance 64. The capacitance of the second stray capacitance 64 changes when user's finger approaches or touches the sensing electrode 60. Therefore, the voltages fed to the first input end 540a and the second input end 540b will be different such that the differential amplifier 540 has a (non-zero) differential output at the output end 540c. In this way, the minute capacitance change on the sensing electrode 60 can be detected by the differential amplifier 540. Moreover, the noise from circuits or power source can be advantageously removed. The detail of the capacitance sensing circuit 50, namely the self-capacitance sensing circuit can be referred to U.S. Pat. No. 8,704,539 filed by the same applicant.

Although the present invention has been described with reference to the preferred embodiment thereof, it will be understood that the present invention is not limited to the details thereof. Various substitutions and modifications have been suggested in the foregoing description, and others will occur to those of ordinary skill in the art. Therefore, all such substitutions and modifications are intended to be embraced within the scope of the present invention as defined in the appended claims.

What is claimed is:

1. A force-touch sensing apparatus with metal traces, comprising:
   an upper substrate;

a metal trace layer arranged on a surface of the upper substrate, and the metal trace layer comprising a plurality of metal traces;

a transparent touch-electrode layer arranged on a side of the metal trace layer, and the transparent touch-electrode layer comprising a plurality of transparent touch sensing electrodes;

an insulating layer arranged between the metal trace layer and the transparent touch-electrode layer;

a transparent force-electrode layer arranged on a side of the transparent touch-electrode layer opposite to the insulating layer, and the transparent force-electrode layer comprising at least one transparent force sensing electrode;

a resilient dielectric material layer arranged between the transparent touch-electrode layer and the transparent force-electrode layer; and a capacitance sensing circuit configured to sequentially or randomly apply a touch capacitance-exciting signal to a selected transparent touch sensing electrode and receive a touch sensing signal from the selected transparent touch sensing electrode for a touch sensing operation; the capacitance sensing circuit configured to further apply a force capacitance-exciting signal to the at least one transparent force sensing electrode, and sequentially or randomly apply a counter-exciting signal to the selected transparent touch sensing electrode and receive a force sensing signal from the at least one transparent force sensing electrode for a force sensing operation;

wherein an overlap percentage between a projection area of the transparent touch sensing electrodes and a projection area of the at least one transparent force sensing electrode is not less than 90%; and wherein the capacitance sensing circuit is configured to apply a shieling signal having the same phase as that of the force capacitance-exciting signal to non-selected transparent touch sensing electrodes in the force sensing operation performed after the touch sensing operation.

2. The force-touch sensing apparatus in claim 1, wherein a gap between each transparent touch sensing electrode and the adjacent transparent touch sensing electrode is not greater than 500 micrometers.

3. The force-touch sensing apparatus in claim 1, wherein the metal traces are composed of at least one metal wire, and a width of the metal wire is not greater than 50 micrometers.

4. The force-touch sensing apparatus in claim 1, wherein the capacitance sensing circuit is a self-capacitance sensing circuit.

5. The force-touch sensing apparatus in claim 1, wherein the metal traces are made with a black metal material or a metal material covered with a black resin.

6. The force-touch sensing apparatus in claim 1, wherein the resilient dielectric material layer comprises a resilient gelatinous material, and the resilient gelatinous material is compressively deformed under force and restores to original shape and volume if force is not present.

7. The force-touch sensing apparatus in claim 1, wherein the capacitance sensing circuit is configured to apply a reflection signal having the same phase as that of the touch capacitance-exciting signal to non-selected transparent touch sensing electrodes in the touch sensing operation.

8. The force-touch sensing apparatus in claim 1, wherein the touch capacitance-exciting signal or the force capacitance-exciting signal is an alternating signal or a current source; the counter-exciting signal is a DC reference signal or an alternating signal with phase opposite to phase of the force capacitance-exciting signal.

9. The force-touch sensing apparatus in claim 8, wherein the DC reference signal is a zero volt signal.

10. The force-touch sensing apparatus in claim 1, wherein the upper substrate is a glass substrate or a polymer material substrate.

11. The force-touch sensing apparatus in claim 1, further comprising:

a lower substrate arranged on a side of the resilient dielectric material layer opposite to the transparent touch-electrode layer; wherein the lower substrate is a glass substrate or a polymer material substrate.

12. The force-touch sensing apparatus in claim 11, wherein the lower substrate is a color filter substrate of a display screen.

13. The force-touch sensing apparatus in claim 11, wherein the transparent force-electrode layer is a static shielding layer of a display screen.

14. The force-touch sensing apparatus in claim 11, wherein the transparent force-electrode layer is a polarizing layer formed by a conductive material of a display screen.

15. A force-touch sensing apparatus with metal traces, comprising:

an upper substrate;

a touch-electrode layer with metal traces arranged on a surface of the upper substrate, and the touch-electrode layer with metal trace comprising a plurality of coplanar metal traces and a plurality of transparent touch sensing electrodes;

a transparent force sensing electrode layer arranged on a side of the touch-electrode layer with metal traces, and the transparent force sensing electrode layer comprising at least one transparent force sensing electrode;

a resilient dielectric material layer arranged between the touch-electrode layer with metal traces and the transparent force sensing electrode layer; the resilient dielectric material layer comprising a resilient gelatinous material, and the resilient gelatinous material compressively deformed under force and restoring to original shape and volume if force is not present; and a capacitance sensing circuit configured to sequentially or randomly apply a touch capacitance-exciting signal to a selected transparent touch sensing electrode and receive a touch sensing signal from the selected transparent touch sensing electrode for a touch sensing operation; the capacitance sensing circuit configured to further apply a force capacitance-exciting signal to the at least one transparent force sensing electrode, and sequentially or randomly apply a counter-exciting signal to the selected transparent touch sensing electrode and receive a force sensing signal from the at least one transparent force sensing electrode for a force sensing operation; wherein an overlap percentage between a sum of a projection area of the transparent touch sensing electrodes and the coplanar metal traces and a projection area of the at least one transparent force sensing electrode is not less than 90%;

wherein the capacitance sensing circuit is configured to apply a shieling signal having the same phase as that of the force capacitance-exciting signal to non-selected transparent touch sensing electrodes in the force sensing operation after the touch sensing operation.

16. The force-touch sensing apparatus in claim 15, wherein a gap between each transparent touch sensing electrode and the adjacent transparent touch sensing electrode is not greater than 500 micrometers; a gap between each transparent touch sensing electrode and the adjacent metal trace is not greater than 500 micrometers.

17. The force-touch sensing apparatus in claim 15, wherein the metal traces are composed of at least one metal wire, and a width of the metal wire is not greater than 50 micrometers.

18. The force-touch sensing apparatus in claim 15, wherein the capacitance sensing circuit is a self-capacitance sensing circuit.

19. The force-touch sensing apparatus in claim 15, wherein the metal traces are made with a black metal material or a metal material covered with a black resin.

20. The force-touch sensing apparatus in claim 15, wherein the capacitance sensing circuit is configured to apply a reflection signal having the same phase as that of the touch capacitance-exciting signal to non-selected transparent touch sensing electrodes in the touch sensing operation.

21. The force-touch sensing apparatus in claim 15, wherein the touch capacitance-exciting signal or the force capacitance-exciting signal is an alternating signal or a current source; the counter-exciting signal is a DC reference signal or an alternating signal with phase opposite to phase of the force capacitance-exciting signal.

22. The force-touch sensing apparatus in claim 15, further comprising:
   a lower substrate arranged on a side of the resilient dielectric material layer opposite to the transparent touch-electrode layer; wherein the lower substrate is a glass substrate or a polymer material substrate.

23. The force-touch sensing apparatus in claim 22, wherein the lower substrate is a color filter substrate of a display screen.

24. The force-touch sensing apparatus in claim 22, wherein the transparent force-electrode layer is a static shielding layer of a display screen.

25. The force-touch sensing apparatus in claim 22, wherein the transparent force-electrode layer is a polarizing layer formed by a conductive material of a display screen.

* * * * *